ated Mar. 28, 1967

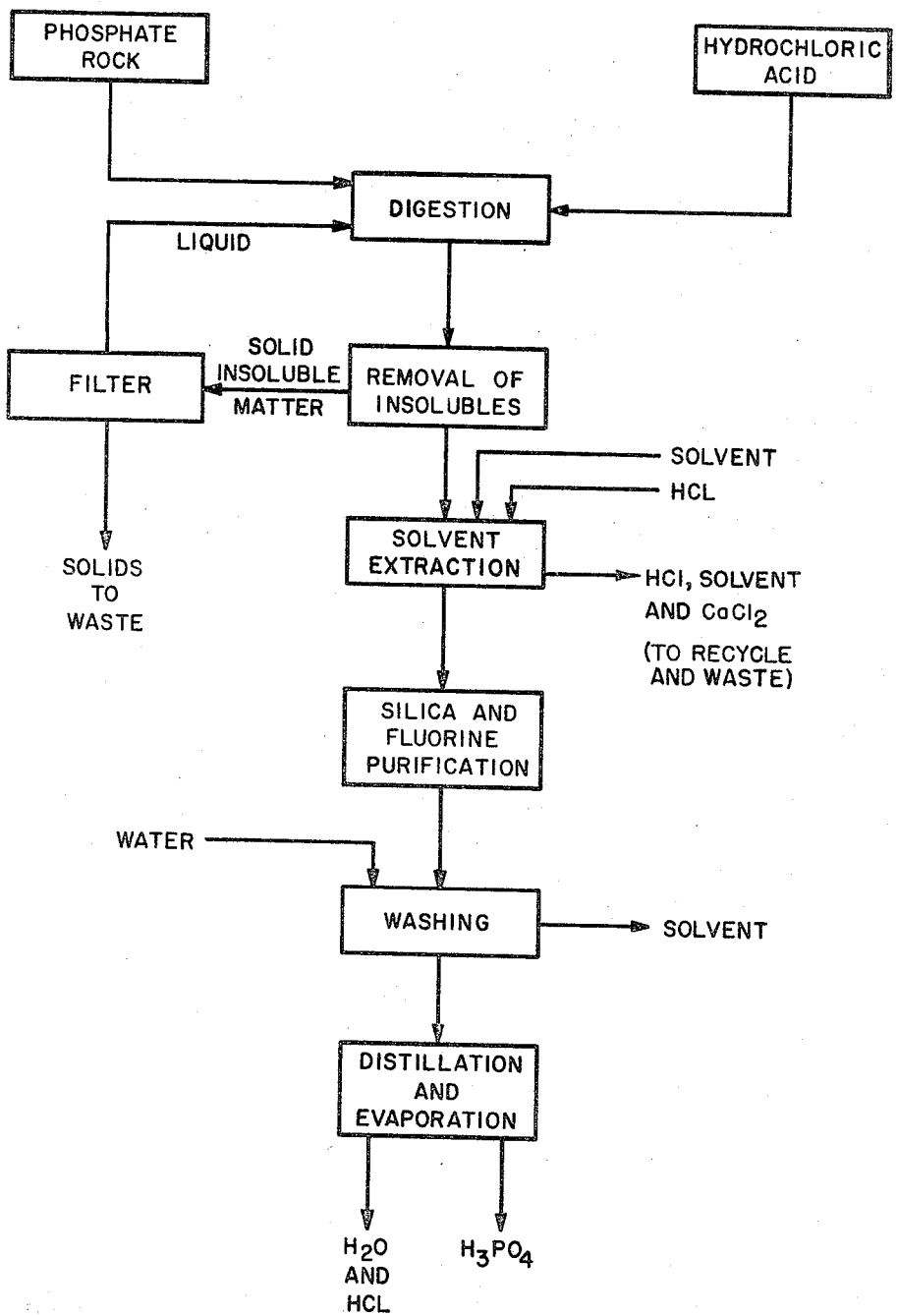

3,311,450
PROCESS FOR THE MANUFACTURE OF PHOSPHORIC ACID
Alexander Alon, 16a Tel-Manek, Ahuza, Haifa, Israel; Ruth Blumberg, 25 Vitkin St., Mount Carmel, Haifa, Israel; and Avraham M. Baniel, 28 Horeb St., Haifa, Israel
Filed May 9, 1963, Ser. No. 279,164
5 Claims. (Cl. 23—165)

This invention relates to a process for the production of phosphoric acid and, more particularly, it pertains to a process for manufacturing phosphoric acid that is substantially free of silica and fluorine.

The first commercially feasible wet process method for the production of high quality phosphoric acid, utilizing hydrochloric acid to decompose phosphate rock, was disclosed by Baniel and Blumberg in U.S. Patent No. 2,880,063. This patent discloses a process wherein phosphate rock is reacted with an excess of aqueous hydrochloric acid to form an aqueous reaction mixture comprising principally phosphoric acid and calcium chloride in addition to certain impurities, e.g., silica and fluorine. Phosphoric acid is extracted from the aqueous reaction mixture by contacting said mixture with an organic solvent, for example, a lower aliphatic alcohol or ketone. The aqueous phase is separated from the solvent phase, the resulting solvent extract is washed with water to release the acid from the solvent and the aqueous acid is concentrated.

Although phosphoric acid produced by this method is quite pure, small amounts of silica and fluorine are extracted, along with phosphoric acid, into the solvent and these remain to contaminate the final product. Such contamination is especially undesirable for certain specialized uses of phosphoric acid, for example, in foods and medicines, where even extremely small amounts of silica and fluorine cannot be countenanced. An additional disadvantage of the presence of silica components is highlighted in the carrying out of the above referred to Baniel and Blumberg process, wherein the presence of small amounts of silica in the solvent extract often results in the formation of emulsions during the washing operation, i.e., the steps in the process wherein the solvent is separated from the acids by washing with water. Emulsion formation at this stage of the process causes serious operational difficulties that necessitate terminating the operation until rectified.

The present invention is an improvement over the above referred to Baniel and Blumberg process, and similar processes wherein calcium phosphate-containing material and hydrochloric acid and sulfuric acid are used to produce phosphoric acid such as that described in the copending application of Baniel, Blumberg and Alon, S.N. 279,156, being filed concurrently herewith. While the above referred to phosphoric acid processes have proved to be fairly satisfactory, these methods are subject to improvement, particularly in regard to preparing high purity phosphoric acid that is substantially free of silica and fluorine.

Accordingly, an object of this invention is to produce high quality phosphoric acid substantially free of silica and fluorine contamination.

When phosphate rock is reacted with hydrochloric acid, the resulting aqueous reaction mixture which is produced contains phosphoric acid, calcium chloride and, as impurities, silica and fluorine. When the aqueous reaction mixture is contacted with an organic solvent, in the presence of free hydrochloric acid, phosphoric acid passes into the organic phase. Simultaneously, some of the silica and fluorine in the aqueous reaction mixture are also carried into the solvent phase. The solvent phase is then separated from the aqueous phase and the resulting solvent extract is washed with water to separate the acids from the solvent; the acids are then separated and concentrated and phosphoric acid is recovered.

We have found that silica and fluorine can be removed from the solvent extract if sodium or potassium salts are added to the solvent extract, containing phosphoric acid and hydrochloric acid, subsequent to extraction and prior to separation of the acids from the solvent. A representative list of some of the suitable sodium or potassium salts are the chlorides, fluorides, phosphates, polyphosphates, oxalates, citrates and the like. The selected salts are added to the solvent extract containing phosphoric acid in amounts at least equal to about the stoichiometric amount of silica and fluorine present in the extract. In a few isolated instances it is necessary to add fluorine, as sodium fluoride, if stoichiometric amounts of fluorine are not found in the solvent extract.

The calcium-phosphate-containing material utilized may be phosphate rock and minerals or ores wherein calcium phosphate is associated with other compounds, such as calcium fluoride. If phosphate rock is used, it may be calcined or uncalcined rock.

We may employ any concentration of mineral acids to digest the phosphate rock. However, we prefer to react the phosphate-containing material with about a 30% hydrochloric acid solution although higher, as well as lower, concentrations can of course be used. The concentration of sulfuric acid is not critical and it may be, for example, between 25%–98%, although concentrated sulfuric acid is preferred.

The amount of mineral acid consumed is that necessary to convert the phosphate values in the phosphate-containing material to phosphoric acid. When a mixture of acids is used, a one-to-one ratio of hydrochloric acid to sulfuric acid, on an acid equivalent basis, produces satisfactory results. An excess amount of acid is present during the reaction.

Suitable solvents for extracting phosphoric acid from the aqueous reaction mixture are those that are capable of dissolving concentrated phosphoric acid but having limited miscibility with water free of phosphoric acid, as well as with water containing phosphoric acid and calcium chloride. The solvents which can be used in the process may be ascertained by reference to data on the mutual miscibility of solvents and water, which is well-known in the art and is available from the literature, e.g., Seidell, Solubilities of Organic Compounds, 3rd edition, vol. II, 1941, D. Van Nostrand Co., Inc., New York, New York, and Landolt-Bornstein, Physikalisch-Chemische Tabellen, 1912, Julius Springer, Berlin, Germany. Representative solvents coming within the above definition are, for example, lower aliphatic alcohols and ketones of limited mutual miscibility with water, such as alcohols containing four to six carbon atoms in the aliphatic group, used alone or in mixture, e.g., butanol, amyl alcohol, isoamyl alcohol, and also, trialkyl phosphates, particularly those containing two to eight carbon atoms in the individual alkyl groups, such as tributyl phosphate and mixtures thereof.

Reference is now made to the drawing showing for the purpose of illustration, a flow sheet representative of the procedure for treating phosphate rock to obtain aqueous phosphoric acid.

Phosphate rock and aqueous hydrochloric acid are added to a digestor and maintained until the reaction is substantially complete. The aqueous reaction mixture produced comprises primarily phosphoric acid, calcium chloride, and impurities, such as silica and fluorine. The aqueous reaction mixture is then subjected to a solids removal step in a mud settler. The solids-containing underflow from the mud settler is either filtered or washed in a countercurrent decantation system and the overflow liquid from either of these operations is recirculated to the digestor. Mud settling, filtration or countercurrent decantation are not necessary steps for performing the process because solid insoluble particles that are carried in the aqueous reaction mixture do not seriously interfere with the subsequent liquid-liquid solvent extraction operation of phosphoric acid. However, economically it is beneficial to filter and recirculate the material coming from the mud settler.

The overflow liquid from the mud settler constitutes the aqueous reaction mixture which is pumped to a phosphate extractor for recovery of phosphoric acid. The phosphate extractor may consist of a series of mixer-settlers wherein the aqueous reaction mixture is contacted countercurrently with an organic liquid which is a solvent for phosphoric acid in the presence of free hydrochloric acid. The hydrochloric acid may be present in the organic solvent, or said acid may be added directly to the aqueous reaction mixture. In any event, free hydrochloric acid is present in the system during the extraction of phosphoric acid into the solvent. The end result is that phosphoric acid, together with part of the hydrochloric acid, passes from the aqueous phase into the solvent phase, while the calcium chloride and the balance of the hydrochloric acid remain in the aqueous phase. In addition, some of the silica and fluorine are removed from the aqueous mixture along with the phosphoric acid and these impurities go into the solvent phase. The aqueous phase is separated from the solvent phase and said solutions are now termed, respectively, the aqueous raffinate and the solvent extract. Hydrochloric acid is separated from the aqueous raffinate by a second solvent extraction operation, preferably using the same organic solvent as that employed to extract phosphoric acid. The solvent and recovered hydrochloric acid are reused in the system. A minor amount of solvent remains in the aqueous calcium chloride solution, and the solvent can be recovered by steam stripping.

The solvent extract contains phosphoric acid, hydrochloric acid, silica and fluorine. The quantities of silica and fluorine present in the solvent extract will vary, depending to a great extent on the initial amounts of silica and fluorine in the phosphate rock.

The quantity of silica and fluorine in the solvent extract can be ascertained by analysis of the solvent stream leaving the phosphate extractor so that sodium and/or potassium salts can be added to the solvent extract in at least stoichiometric amounts in order to precipitate the alkali fluosilicates. After precipitation of silica and fluorine the resulting solvent extract is then washed with water thereby transferring phosphoric acid and hydrochloric acid to the aqueous media, thus freeing the solvent for recycle. Said aqueous acids are separated and concentrated by distillation and evaporation, and concentrated phosphoric acid is recovered.

It is apparent that the process described above in connection with the flow sheet is subject to numerous modifications, and in order to further illustrate the nature of the invention, the following examples may be taken as illustrative and not by way of limitation thereof.

*Example 1*

2000 g. phosphate rock containing 33% $P_2O_5$ was decomposed by aqueous hydrochloric acid containing 1300 g. of HCl and 3900 g. of water. The resulting reaction mixture was diluted with water to a volume of 5400 mls. and filtered. The clear filtrate was circulated to a continuous extractor unit of the mixer-settler type and contacted countercurrently with 7800 g. of isoamyl alcohol, 300 g. HCl and 1800 g. of water. The solutions separated into an aqueous phase and a solvent phase. The solvent extract contained 56 g./l. $P_2O_5$, 0.10 g./l. $SiO_2$ and 0.14 g./l. F. To this solution, NaCl and NaF are added in amounts of 0.08 g. and 0.11 g., respectively, per liter solvent extract, and stirred for 5 minutes. A fine precipitate formed and was allowed to settle for 2 hours. The clear supernatant solvent was removed and brought in contact with water to extract the acids. A clear separation between the phases was obtained and no emulsion was encountered in any stage of this extraction. The depleted solvent was again recharged with hydrochloric acid and reused again in the extraction of $H_3PO_4$ from the aqueous reaction mixture. The aqueous acids, phosphoric and hydrochloric, and some solvent which remained in the acids were separated by evaporation. The concentrated phosphoric acid obtained was substantially free of silica and fluorine.

*Example 2*

10 liters of the solvent extract prepared as described in Example 1, with the exception that the organic solvent was n-butanol rather than i–AmOH, contained 520 g. $P_2O_5$, 0.7 g. $SiO_2$ and 2.9 g. $F^-$. 1.75 g. of KCl was added to this solution. The mixture was stirred for 5 minutes and allowed to settle for 2 hours. A fine precipitate was formed. The clear supernatant solvent obtained was washed with water, as described in Example 1. No emulsification was encountered. Concentrated phosphoric acid substantially free of silica was obtained as a final product.

*Example 3*

10 liters of solvent extract prepared as described in Example 1, contained 520 g. $P_2O_5$, 400 g. HCl, aqueous i–AmOH, 1.2 g. $SiO_2$ and 4.0 g. $F^-$. 2.66 g. of tetrasodium pyrophosphate ($Na_4P_2O_7$) was added to this solution. The mixture was stirred for 5 minutes and it was allowed to settle for 2 hours. A fine precipitate of sodium fluosilicate was formed. The clear supernatant solvent obtained was washed with water in order to transfer the acids into the aqueous phase. The phase separation was very good, no emulsion was formed during the separation of acids from solvent. The acids were separated from each other by evaporation and concentrated phosphoric acid was obtained substantially free of silica.

*Example 4*

10 liters of solvent extract prepared as described in Example 1, contained 500 g. $P_2O_5$, 400 g. HCl, aqueous n-butanol, 0.7 g. $SiO_2$ and 1.7 g. $F^-$. 2.29 g. of sodium citrate ($Na_3C_6H_5O_7 \cdot 2H_2O$) was added to this solution. After stirring the mixture for 5 minutes it was allowed to settle for 2 hours and a fine precipitate was formed. The clear supernatant solvent obtained was washed with water in an extractor unit in order to transfer the acids into the aqueous phase. The phase separation was very good, no emulsion was formed during the extraction of acids from solvent. The acids were separated by evaporation and concentrated phosphoric acid substantially free of silica was obtained as the final product.

What is claimed is:

1. In a process for the manufacture of phosphoric acid substantially free of silica and fluorine comprising the steps of reacting a calcium phosphate-containing material which also contains silica and fluorine components with a mineral acid selected from the group consisting of hydrochloric acid and hydrochloric acid and sulfuric acid to produce an aqueous reaction mixture containing calcium chloride, phosphoric acid and silica and fluorine compounds, extracting phosphoric acid from said aqueous mixture in the presence of free hydrochloric acid with an organic solvent capable of dissolving phosphoric acid but having limited miscibility with water free of phosphoric acid, as well as with water containing phosphoric acid and calcium chloride, and separating the solvent extract thus obtained from the aqueous extract, the improvement comprising adding to said separated solvent extract a salt of a cation selected from the group consisting of sodium and potassium, and mixtures thereof, in at least about stoichiometric amounts to form a fluosilicate, and extracting and recovering phosphoric acid from the solvent extract.

2. The process according to claim 1 wherein the calcium-phosphate containing material is phosphate rock.

3. The process according to claim 2 wherein the mineral acid is hydrochloric acid.

4. The process according to claim 1 wherein the organic solvent is selected from the group consisting of lower aliphatic alcohols and ketones of limited miscibility with water and trialkyl phosphates having two to eight carbon atoms in the individual alkyl groups.

5. In a process for the manufacture of phosphoric acid substantially free of silica and fluorine comprising the steps of reacting phosphate rock which also contains silica and fluorine components with hydrochloric acid to produce an aqueous reaction mixture containing calcium chloride and phosphoric acid and silica and fluorine compounds, extracting phosphoric acid from said aqueous mixture in the presence of free hydrochloric acid with an organic solvent capable of dissolving phosphoric acid but having limited miscibility with water free of phosphoric acid, as well as with water containing phosphoric acid and calcium chloride, and separating the solvent extract thus obtained from the aqueous extract, the improvement comprising adding to said separated solvent extract a salt of a cation selected from the group consisting of sodium and potassium, and mixtures thereof, in at least about stoichiometric amounts in order to precipitate silica and fluorine, separating the solvent extract from phosphoric acid by washing with water, separating hydrochloric acid from phosphoric acid by distillation, and recovering concentrated phosphoric acid by evaporation.

References Cited by the Examiner
UNITED STATES PATENTS

| | | | |
|---|---|---|---|
| 1,906,386 | 2/1933 | Liljenroth | 23—165 |
| 2,035,850 | 3/1936 | Vivian | 23—165 |
| 2,885,265 | 5/1959 | Cunningham | 23—165 |
| 3,072,461 | 1/1963 | Long et al. | 23—165 |

OSCAR R. VERTIZ, *Primary Examiner.*

O. F. CRUTCHFIELD, *Assistant Examiner.*